United States Patent Office 2,741,544
Patented Apr. 10, 1956

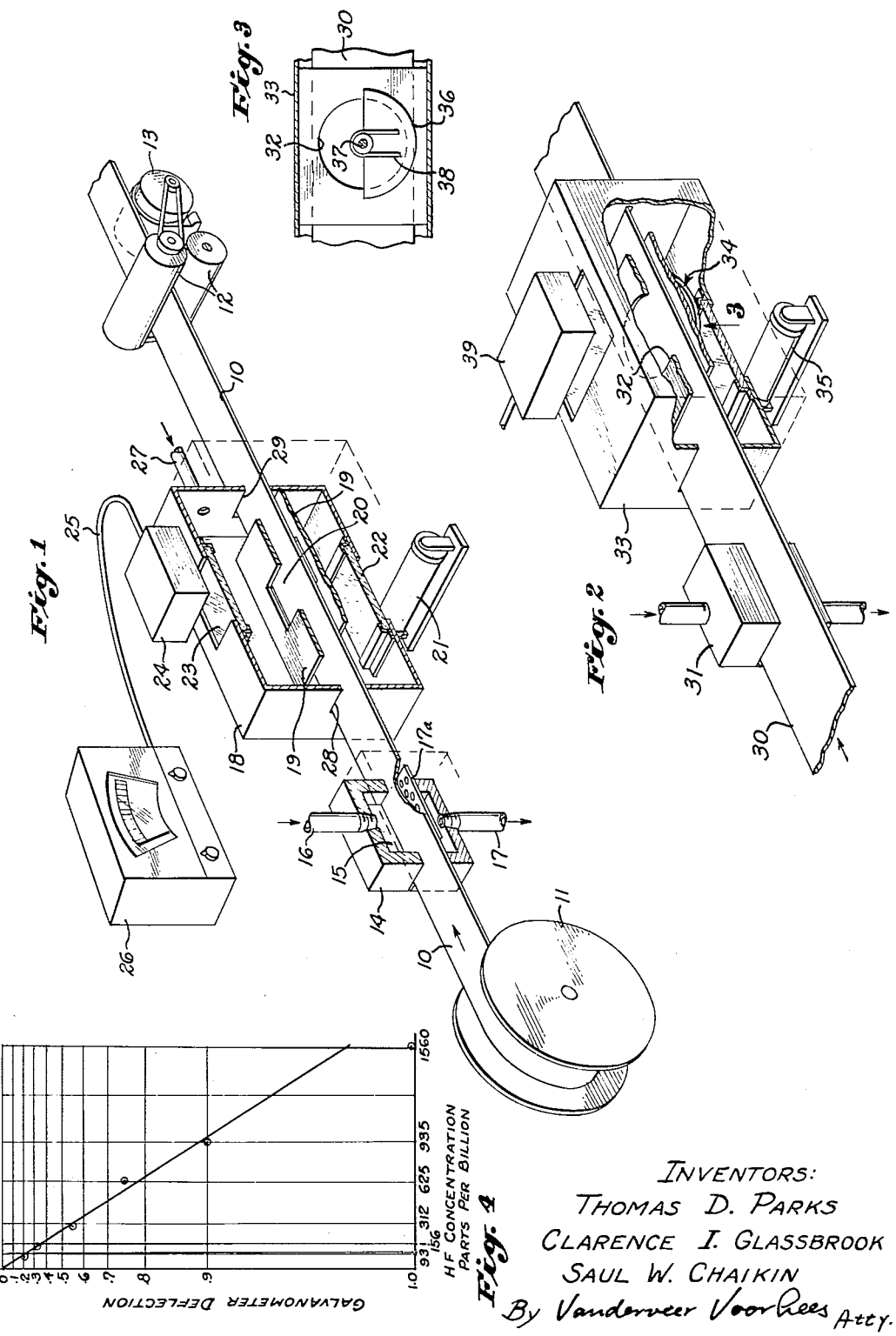

2,741,544

APPARATUS FOR FLUORIDE ANALYSIS

Saul W. Chaikin, Palo Alto, Thomas D. Parks, San Lorenzo, and Clarence I. Glassbrook, Hayward, Calif., assignors to Stanford Research Institute, Stanford, Calif., a corporation of California Application November 1, 1952, Serial No. 318,304

6 Claims. (Cl. 23—255)

This invention relates to a method and apparatus for analysing gases and vapors for fluorides and particularly for the determination of hydrogen fluoride therein. It relates still more particularly to the quantitative determination of traces of fluorides present in fluids where the concentration may vary from time to time, requiring a continuous analysis of said fluids.

One object of the invention is to provide a method and apparatus for continuously determining and recording the amount of fluorides such as hydrogen fluoride or dispersed metallic fluorides in air, flue gas and the like when present in a concentration of the order of about one part per million or less. Another object of the invention is to provide an apparatus which will operate promptly a warning signal when the amount of fluoride in a gas or air stream reaches dangerous proportions.

The invention is illustrated by a drawing in which Figure 1 is a diagrammatic representation partly in section of one form of apparatus suitable for carrying out the method. Figure 2 is a part of a modified form of the apparatus with compensating feature. Figure 3 is a view of the shutter element of Figure 2. Figure 4 is a graph showing the results obtained in a calibration of the instrument.

Many industrial plants employ hydrogen fluoride in their processes such as in the catalytic conversion of hydrocarbons. Smelters and furnaces frequently discharge fluorides in their waste flue gases, partly as hydrogen fluoride and partly as highly dispersed particles or "smokes" of metal fluorides of calcium, potassium, sodium, and the like. Manufacturers of hydrogen fluoride, ammonium fluoride and silicofluoride sometimes allow these materials to escape with their waste gases. In the metallurgy of aluminum, fluorides are vaporized from the cryolite employed in electrolytic cells.

Pollution of the atmosphere about such plants may be accidental and intermittent but is of great concern to the communities surrounding such plants, owing to the highly toxic nature of fluorides, particularly hydrogen fluoride. Heretofore it has been necessary to sample the atmosphere and conduct a painstaking analysis of the gases—a time-consuming operation and one which, at best, gives only spot checks on the toxic conditions. The present invention provides a method of reporting and recording results currently so that, within minutes of excessive HF evolution, corrective measures can be taken. With proper adjustments and corrections, the method of this invention is capable of determining concentrations of fluorides in gases in the range of 1 to 1000 parts per billion or more. In the case of flue gases, amounts of 1 to 100 parts per million are significant.

Referring to the drawing Figure 1, a strip of paper or other suitable tape or film 10 is drawn at a uniform rate from supply roll 11 by feed rolls 12 driven by synchronous motor 13. The strip 10 is suitably prepared of purified filter paper such as Whatmans No. 4 activated with a fluorescing agent which is sensitive to quenching by hydrogen fluoride. Magnesium oxinate has been found very satisfactory when applied in the proper amount and manner as will be described hereinafter.

From supply roll 11 the tape passes through quenching chamber 14, shown in cutaway section, which is suitably a metal block in two halves fitting closely together against the tape and containing a cavity 15. The gas to be analysed is passed into cavity 15 by conduit 16, then through the pores of the strip and out through conduit 17 to which a vacuum can be applied. A rate of about 2.5 liters of sample gas per minute through an exposure of one square inch is satisfactory. In passing between the halves of chamber 14, the tape serves as a gasket to retard leakage of the sample gas from cavity 15. The two halves of the chamber can be held together by springs, by gravity or other means. A perforated plate or grid 17a may support the strip against the pressure differential applied to it.

In the chamber 14, the tape is partially desensitized by the hydrogen fluoride in the gas sample, the degree of desensitization depending on the concentration of HF in the sample gas. Travelling at constant speed the tape passes thence to the fluorescing chamber 18 where it passes between shields 19 across window 20. A beam of ultraviolet light of constant intensity from lamp 21 passes through filter 22 and impinges on the paper in window 20. Light of other wave lengths can be used but U. V. is most convenient. The resulting fluorescent light from the excited magnesium oxinate in the paper, passes through filter 23 where incident U. V. light is screened out leaving the fluorescent light to pass into photo-electric cell 24. The electrical energy produced in cell 24 flows by conduit 25 to galvanometer 26 which indicates the intensity of the light from the unquenched fluorescing agent in the tape. If desired, a lens may be interposed between the window 20 and the photo-electric cell to concentrate the illumination on the cell. From the reading of the galvanometer, the fluoride concentration in the sample is determined by means of a calibration with known concentrations of fluoride, high concentration corresponding to low output from the photoelectric cell 24. Figure 4 shows such a calibration.

In order to avoid or reduce interference from phosphorescent light, particularly that originating as background light from the tape material itself, in most cases, cellulose, an intermittent U. V. light source can be employed for excitation of the tape such as the light from a quartz lamp energized by a 60 cycle power source. The galvanometer 26 is then replaced by an A. C. galvanometer which has been made responsive only to the 60 cycle pulsating electrical energy derived solely from the fluorescent light. For this purpose we can use the "Densichron" or the "Photovolt" instruments. Constant energy resulting from phosphorescent light is not registered on this instrument and by its use we have been able to reduce to half, the effect of phosphorescent light.

It has been found that water vapor in the sample interferes by itself quenching or partially quenching the fluorescence and by reducing the sensitivity of the fluorescing agent to fluoride quenching in quench chamber 14. This effect can be overcome by heating the chamber 14 sufficient to prevent moisture absorption. Usually a temperature in the range of 60° to 70° C. is satisfactory, in general an increase of 30–40° C. above the dew point being satisfactory. An electrical resistance heating element in the metal block forming the sampling or quenching chamber 14, is effective for the purpose.

The deactivating effect of moisture in the analysing or fluorescing chamber 18 is prevented by maintaining an atmosphere of dry gas therein. A current of dessicated air, $CO_2$, nitrogen or other inert dry gas can be introduced through inlet 27 for this purpose. Sufficient dry gas is admitted to maintain an outwardly flowing current of gas at silts 28 and 29 in housing 18 where the strip 10 passes through. The housing 18 is conveniently made of "Plexiglas" or other plastic material but it is contemplated housing the entire assemblage in a case which is filled with a dry atmosphere.

In order to calibrate the instrument, it was found convenient to introduce known amounts of HF into a metered air stream and conduct the contaminated air through duct 16 to the quenching chamber 14. For this purpose, a dilute solution of HF was passed at a slow rate onto a hot platinum foil heated electrically to instantly evaporate the solution in the surrounding air stream. By regulating the rate of flow of HF solution, any desired concentration of HF in the air stream is obtainable. It was found that glass apparatus could be used for HF solutions and gas mixtures in low concentrations of the order of .01 to .001 N without attack.

The photoelectric cell 24 is of any well-known type, copper oxide, selenium, sodium, etc. and cells commonly employed in photography, sensitive to light in the visible range, are most convenient. The electrical signal from cell 24 is preferably applied to a recording instrument such as the "Brown Electronik" recorder, giving a permanent record of HF concentration in the gases or atmosphere tested. The gain of the Densichron is adjusted so that the light from the sensitized strip when no HF is present, reads zero on the recorder.

The fluorescing strip 10 can be made by passing a strip of purified cellulosic paper through a bath of magnesium chloride solution, drying, then passing through a bath of oxine (8-hydroxy quinoline) and again drying. The second treatment is best done in the absence of actinic light and the treated strip should be protected from strong light at all times until it has emerged from the analyser. A loss of activity of 50% in 22 hours' exposure to light has been observed, and a loss of 30% activity has been observed after 4 months' dark storage.

The amount of magnesium oxinate deposit impregnated in the strip affects the sensitivity, inasmuch as excessive amounts are less readily quenched by HF. If the magnesium salt solution employed contains about 1 to 3 mg. $MgCl_2.6H_2O$ per cc. and the same concentration of oxine solution is employed, the best results are obtained. The oxinate can be applied as a solution in acetone or other organic solvents but the tape made in this way is less sensitive.

One limitation of the sensitivity of the fluoride analyser results from variations in the properties of the paper or other material of which the tape 10 is constituted. It has not been possible to find a tape material entirely uniform and in general the non-uniformity arising from this source may be about 5 to 15%. The principal cause of variation in the properties is variation in thickness of the paper which causes it to absorb variable amounts of the fluorescing agent, provides uneven penetration by hydrogen fluoride containing gases in the quenching chamber, etc. Enlarging the sampling area of the tape in 14 and corresponding window area 20 is only partially effective in solving this problem and reduces resolution. The modified form of apparatus shown in Figure 2 is designed to reduce or eliminate these variable effects.

Referring to Figure 2, tape 30 passes through quenching chamber or block 31 which exposes only a portion, e. g., one side or several longitudinal strips of the tape to the sample gases which exert their quenching action on the exposed area or areas only. As the tape passes subsequently under window 32 in analysing chamber 33, it is exposed to a beam of exciting U. V. light alternating between the exposed and the unexposed portions of the strip by means of a suitable shutter. In Figure 2 a rotating shutter 34 is shown between the light source 35 and the window 32. A reciprocating shutter can alternatively be employed. The shutter is shown in more detail in Figure 3 where a semicircular plate 36 revolves on axis 37, being driven by belt 38 or other suitable means. The window 32 is circular, providing a constant amount of illumination from the half exposed by the shutter disk 36. The light source employed in this modification should be constant and the speed of the shutter can be conveniently 3600 R. P. M. When the exposed and unexposed areas of the tape 30 in chamber 31 have equal fluorescing intensity, i. e.—when no quenching has occurred in chamber 31, the radiated light from window 32 is constant and the photo cell 39 produces a steady E. M. F. with no deflection in the A. C. galvanometer. As the amount of fluoride in the gases supplied to quench chamber 31 increases, however, the radiated light from window 32 fluctuates with the movement of the shutter 34 and the resulting pulsating electrical energy is indicated on the galvanometer or "Densichron," the deflection being proportional to the degree of quenching in the exposed area or areas of the tape. Another method which can be used to cancel out errors due to variations in the tape or other sensitized surface is the "double beam" system. According to this method, two fluorescing chambers 18 are employed, in series, one before the quench chamber 14 and the other after. By comparing the electrical signals from both instruments, allowing for the time required for the tape to pass from one to the other, the quenching effect of the sample can easily be determined. Thus, both signals can be recorded by a stylus on a chart or tape in the form of a graph with the recordings synchronized so that the quenching effect will appear as a deviation between the lines. Or the signal from the first fluorescing chamber, the control beam, can be recorded on a magnetic wire or tape synchronized with the movement of tape 10, then reproduced and opposed or otherwise compared to the signal from the second fluorescing chamber, the analysing beam, thus cancelling out effects due to background fluorescence, phosphorescence, etc. regardless of variations in the tape or other sensitized surface employed. The recorded signal from the control beam can be on a magnetizable line or strip on the fluorescing tape itself, preferably along one edge thereof, thus providing more accurate synchronization than can be obtained with a separate magnetic recording.

Still another method of correcting for variations in the fluorescing activity of the tape or other surface is to mask out part of the fluorescing area of the surface where activity is excessive. This can be done by exposing the sensitized tape to a beam of U. V. light and employing the emitted, fluorescent light to operate the masking device. Various masking devices can be employed such as a lead or ink pencil, an opaque spray, a punch to cut out part of the active surface, or a beam of U. V. light of high intensity sufficient to destroy the activity of part of the surface. The tape can be provided with a perforated track to more accurately control the position in the analyser and the rate of travel.

Many substances have been tested as fluorescing agents and the following have been found effective: Oxine salts of aluminum, cadmium, magnesium, and strontium; aluminum 2-hydroxy quinoline; aluminum acetyl salicylic acid; aluminum and magnesium oxine-5-sulfonic acid; magnesium morin. Other HF-quenchable fluorescing substance can be used.

In preparing the sensitized strip by the preferred method, it is passed at a uniform rate through a solution of a salt of the desired metal, then through a solution of oxine, morin, or other organic compound with which the metal is combined, preferably drying between treatments. The resulting compound is probably a chelate type salt. The amount of deposit on the paper strip affects its sensitivity and we have found that a solution concentration of about 1 mg. per cc. for each bath is satisfactory for HF concentrations in the range of 50 to 1000 parts per billion. After successively immersing and drying the strip, preferably in the order: metal salt-organic agent, the sensitized strip is wound on a spool and kept in a dry atmosphere in the dark.

Magnesium oxinate applied to Whatman No. 4 filter paper which is a purified cellulose, gave best results of those substances tested. Instead of immersing the paper in the bath, the solutions can be sprayed onto the paper successively, and by this method, variations due to variable thickness of paper amounting to as much as 5–15% can be largely eliminated. However, the strips prepared in this manner were less sensitive than those made by immersion. The magnesium oxinate is best excited by the 3650 A. line of mercury and in general it is best to use an exciting light corresponding to the longest wave length absorbed by the substance. When employing the mercury lamp to excite the fluorescing agent, a Wratten K–2 filter can be used between the window 20 and cell 24, cutting off all light below 4800 A. The light emitted from magnesium oxinate is chiefly in the range 4500–5500 A.

Instead of radiating the sensitized strip on the opposite side from the photo cell, we can radiate it on the same side, but the results are less desirable and the arrangement is less convenient. A quartz rod can be used to conduct the light from the lamp to the tape, thus allowing the light source to be placed remote from the tape.

If desired, the sensitive strip may be impervious to gases and the sensitive coating may be applied to one side only. Exposure of this side of the strip to the sample gases and excitation of the exposed side by ultraviolet radiation is employed to determine the amount of fluorescence quenching resulting from the exposure. The sensitized coating may be applied with gelatin, collodion, methyl cellulose, or other binding agent and the strip may be of regenerated cellulose (Cellophane) plastic or metal foil, e. g., aluminum foil, etc. It is desirable to select materials producing a minimum background fluorescence which must be corrected for.

As indicated hereinabove, the sensitivity of the apparatus can be increased by increasing the area of strip exposed to the sample gases, but resolution is thereby reduced. With a tape speed of ½ cm. per minute, a window of 1 inch length results in a resolution of five minutes, i. e., variations in HF concentration occurring in intervals of less than five minutes are not detectable. Greater resolution is obtained by using a shorter window and/or increasing the speed of the tape. Conversely, increasing the length of the window 20, or decreasing the speed of the tape, has the effect of averaging a larger sample of gas and also averaging a wider area of tape, thereby tending to eliminate errors due to variations in the tape such as described hereinabove. In some cases as in the analysis of atmospheric air somewhat remote from the source of pollution, a sampling time of twenty to thirty minutes may be preferred.

When analysing gases containing metal fluorides, smokes, etc., it is necessary to convert the fluorides to hydrogen fluoride which is effected by passing the sample stream with moisture through a hot tube at a temperature above the temperature of hydrolysis of the fluoride. The reaction: $MeF_2 + H_2O = MeO + 2HF$ results and the gases are then analysed for HF in the usual manner as above described. Temperatures of about 1000° C. are sufficient for this purpose and can be obtained in an electrically heated platinum tube. In the case of fluorides contained in water solutions, the solution is conveniently dispersed in a gas stream, air for example, and conducted through a hot tube to hydrolyse the fluorides to HF. The resulting gases are maintained at a sufficiently high temperature, e. g., 70–90° C., in the quenching chamber to prevent the water vapor interfering with the reaction.

Altho we have described the use of a tape or strip of indefinite length as support for the fluorescing agent of our invention, we contemplate using other forms of surfaces such as a continuous strip or belt which, after leaving the fluorescing zone, passes to a sensitizing chamber where the active surface is renewed, for example, by application of fresh magnesium oxinate, then to the sampling chamber again. The same cycle can be provided by using a disk or cylinder which is re-sensitized each revolution.

We also contemplate a simplified form of apparatus for field work in which the sampling chamber and roll of sensitized tape are carried to the sampling point in a suitable case, exposed and dated and returned to the laboratory for analysing by the fluorescing method hereinabove described.

In describing our invention, we have shown an apparatus in which the travel of tape and rate of feeding sample gas are held constant and the degree of quenching effected by the sample is determined by the variations in intensity of fluorescent light. We can also control the rate of tape travel or the rate of gas flow to give a constant fluorescent response, in which case the variations in tape speed or gas flow will indicate fluoride concentration. Thus the energy from the photo cell 24 can be amplified to control the speed of motor 13, using a variable speed motor in this case.

We may also employ an apparatus wherein the quenching zone and analysing zone are combined, i. e., the sample gas is lead directly into the chamber where the tape is exposed to exciting light. A more compact instrument can be constructed in this manner.

Other applications and modifications of our method and apparatus will be apparent and we intend that our invention be commensurate with the following claims.

We claim:

1. An apparatus for continuously determining the hydrogen fluoride concentration in a gas when present in traces which comprises a quenching chamber, a fluorescing chamber, a movable strip sensitized with a fluorescing agent quenchable by hydrogen fluoride, means for passing said strip at a uniform rate through said quenching chamber and then through said fluorescing chamber, means for introducing said gas into said quenching chamber at a uniform rate, means for radiating said strip in said fluorescing chamber with exciting light, and a photometer positioned to react to emitted light from said strip in said fluorescing chamber, said photometer being sensitive to light emitted by said strip and insensitive to said exciting light.

2. The apparatus of claim 1 wherein means are provided for continuously recording the response of said photometer.

3. The apparatus of claim 1 wherein means are provided for controlling the humidity of said fluorescing chamber.

4. The apparatus of claim 1 wherein said exciting light is intermittent and said photometer responds only to light having the same frequency as said exciting light, thereby nullifying the effect of phosphorescence of said strip.

5. In an apparatus for continuously determining hydrogen fluoride in gases, having a sampling stage in which said gases contact a fluorescing agent quenchable by hydrogen fluoride and an analysing stage in which the residual fluorescing activity of said agent is tested, the improvement comprising means for drawing thru said sampling stage at a uniform rate of travel, in contact with said gases, a porous, paper tape of purified cellulose impregnated with said fluorescing agent, means for forcing a representative sample of said gases thru said tape at a controlled rate proportional to the rate of travel of said tape thru said sampling stage, means for subsequently activating said tape with an exciting light, and a photometer for measuring the luminous activity of said tape, insensitive to said exciting light.

6. The apparatus of claim 5, wherein said fluorescing agent is a metal oxinate.

References Cited in the file of this patent

UNITED STATES PATENTS

| | | |
|---|---|---|
| 1,949,330 | Redd | Feb. 27, 1934 |
| 2,113,063 | Stryker et al. | Apr. 15, 1938 |
| 2,233,622 | Moses et al. | Feb. 18, 1941 |
| 2,253,356 | Van Den Akker | Aug. 19, 1941 |
| 2,345,090 | Brace | Mar. 28, 1944 |
| 2,538,784 | Kantrowitz | Jan. 23, 1951 |
| 2,551,281 | Moses et al. | May 1, 1951 |
| 2,551,542 | Marsh et al. | May 1, 1951 |
| 2,554,414 | McClendon | May 22, 1951 |
| 2,593,206 | Short | Apr. 15, 1952 |
| 2,602,729 | Curry | July 8, 1952 |
| 2,639,418 | Sundstrom et al. | May 19, 1953 |

OTHER REFERENCES

Volmar: "Bull. Soc. Chem.," vol. 53, page 385 (1933).

Pringsheim: "Luminescence of Liquids and Solids," pages 70, 105 (1943), Interscience Publishers, Inc., N. Y. C.

De Ment: "Fluorochemistry," pages 97, 98 (1945), Chemical Publishing Co., Brooklyn, N. Y.

Feigl et al.: "Anal. Chim. Acta," vol. 3, pages 561–6, 1949.